UNITED STATES PATENT OFFICE.

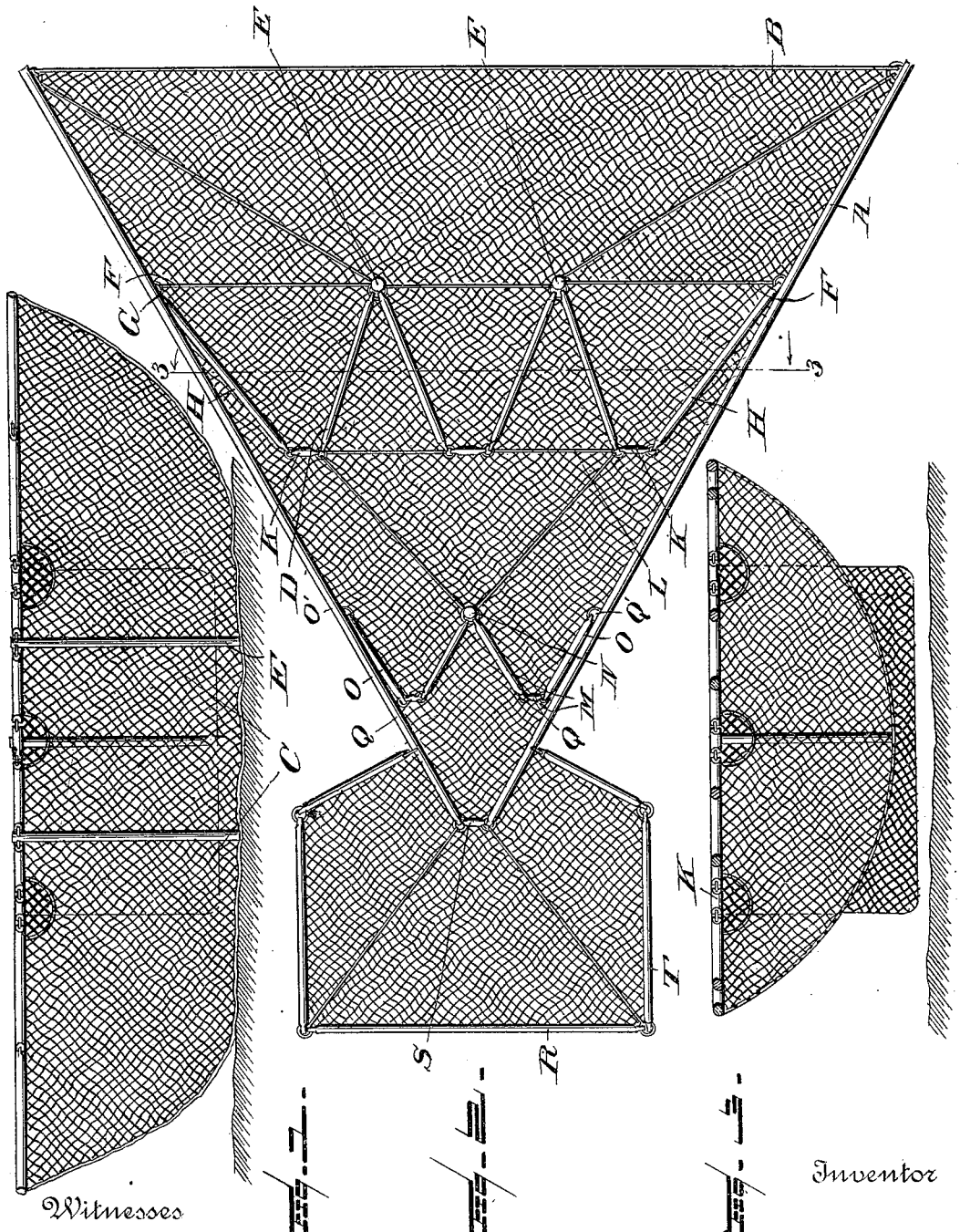

THOMAS REDDING, OF SEATTLE, WASHINGTON.

FISH TRAP-NET.

SPECIFICATION forming part of Letters Patent No. 644,459, dated February 27, 1900.

Application filed October 24, 1899. Serial No. 734,658. (No model.)

*To all whom it may concern:*

Be it known that I, THOMAS REDDING, a citizen of the United States, residing at Seattle, in the county of King and State of Washington, have invented certain new and useful Improvements in Fish Trap-Nets; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fish-nets; and the object of the invention is to produce a net which may be either towed by boats, being allowed to drag through the water, or held by anchors and supported by means of suitable floats.

More specifically, the present invention consists in the provision of a drag-net which is substantially V shape and having vertical tapering netted walls and partitions subdividing the compartments in such manner as to allow fish to easily pass within the compartments and make it difficult to escape and the provision of a trap or compartment at the apex of the net or float supporting the same to receive the fish that have been captured as the net is dragged through the water.

To these ends and to such others as the invention may pertain the same consists in the novel construction, arrangement, and adaptation of parts, as will be hereinafter more fully described and then specifically defined in the appended claims.

My invention is clearly illustrated in the accompanying drawings, which, with the letters of reference marked thereon, form part of this application, and in which drawings similar letters of reference indicate like parts throughout the several views, in which—

Figure 1 is an end elevation looking into the trap or net from its open end. Fig. 2 is a top plan view of the fish-trap, and Fig. 3 is a vertical transverse section on line 3 3 of Fig. 2.

Reference now being had to the details of the drawings by letter, A A designate two floats made of any buoyant material and arranged in V shape, as clearly illustrated in Fig. 2 of the drawings. To these floats are secured the edges of the netting B, which extend downwardly any sufficient distance underneath the water. At any suitable locations upon the upper face of said netting rise the V-shaped partitions C. (Shown in elevation in Fig. 1 of the drawings.) These partitions are made of netting and have secured to their upper edges the floats D. In the drawings there are illustrated but two of these V-shaped partitions with floats at their upper edges with their apexes pointing toward the open end of the net or trap. At each apex of said partitions is secured a vertical strip E, the lower ends of which are secured to the netting in any suitable manner, these strips being clearly shown in elevation in Fig. 1 of the drawings and are provided for the purpose of holding the bottom of the net at a given distance below the floats secured to the top thereof. Connecting the upper ends of the strips E with the side floats A A is a rod or rope F. Connected to a ring or loop G on the floats A A, to which loops the rod or wire F is connected, are the floats H, the inner ends of which are connected to the rear or inner ends of the floats D by means of links K. Underneath each of said floats H are partitions made of netting, and a space is left between the netting forming such wall on either side of the trap between the inner ends of said strips and the inner ends of the floats D for the purpose of allowing fish which are caught in the net between the flaring floats A to pass farther in toward the receptacle which is connected at the apex of the net to receive the same. A similar link K connects the inner ends of the middle floats D, a space being left between the partitions for the same purpose of allowing fish to pass through. In order to hold the floats D in their proper positions, ropes or rods L are provided, which connect the links K.

Near the apex of the trap are partitions of V shape, with the apex pointing outward, said partitions being connected at their upper ends to the floats M, which floats are connected at their apex to the vertical strip N, and floats O are connected by links Q to the inner ends of the floats M and passage-ways are provided between the inner ends of the floats O for the passage of fish to the inner compartment adjacent to the receptacle R. The inner ends of the floats A are connected by a link S, having a space intervening between the walls supported by the floats A to allow the fish to pass from the V-shaped netting into said receptacle R. This receptacle R, which is shown made of netting, may be made solid, if preferred, and is supported by the floats T, connected together in the manner illustrated. This receptacle may be of any shape desired and preferably extends a short distance below the netting forming the trap proper, as illustrated in Fig. 3 of the drawings, it being the purpose of this receptacle to receive the fish that have passed through the various compartments of the trap and to retain the same and still allow the water to circulate through the receptacle.

It is my design to attach the outer ends of the floats A A either to steamboats, one at each end, and tow the trap through the water or to anchor the outer ends of the floats, preferably in a current, the floats being provided to keep the upper edges of the partition-walls upon the surface of the water.

Having thus described my invention, what I claim to be new, and desire to secure by Letters Patent, is—

1. A drag-net comprising a V-shaped net, floats supporting the same, a fish-retaining receptacle secured to the apex of said net, and communicating therewith, V-shaped vertical partition-walls dividing the net into compartments, floats supporting the upper ends of said partition-walls, and means for holding the lower ends of the partition-walls below the surface of the water, as set forth.

2. A drag-net comprising a trap having vertical walls and floats supporting the same, a fish-retaining receptacle secured to the apex of the trap communicating therewith, V-shaped partition-walls having apexes outwardly disposed, floats supporting the same walls, and vertical strips connected to the apexes, the lower ends secured to the bottom of the net, links connecting the inner ends of the floats secured to the partition-walls, and rods connecting the links, suitable passage-ways being left underneath the links, as shown and described.

In testimony whereof I affix my signature in presence of two witnesses.

THOMAS REDDING.

Witnesses:
   L. PROPER,
   WALTER CARMAN.